United States Patent [19]

VanDusen

[11] Patent Number: 5,146,087
[45] Date of Patent: Sep. 8, 1992

[54] IMAGING PROCESS WITH INFRARED SENSITIVE TRANSPARENT RECEIVER SHEETS

[75] Inventor: John G. VanDusen, Walworth, N.Y.

[73] Assignee: Xerox Corporation, Stamford, Conn.

[21] Appl. No.: 734,709

[22] Filed: Jul. 23, 1991

[51] Int. Cl.[5] .............................................. G06K 7/10
[52] U.S. Cl. .................. 250/271; 250/223 R
[58] Field of Search .................... 250/271, 223 R; 355/311; 283/77, 112

[56] References Cited

U.S. PATENT DOCUMENTS

| | | | |
|---|---|---|---|
| 3,566,120 | 2/1971 | Lane, Jr. ............................... | 250/271 |
| 3,684,890 | 8/1972 | Hayne et al. ......................... | 250/223 |
| 3,882,308 | 5/1975 | Daughton et al. .................... | 250/222 R |
| 3,932,755 | 1/1976 | Sagawa ................................. | 250/349 |
| 4,513,404 | 4/1985 | Huggins ................................ | 367/93 |
| 4,553,033 | 11/1985 | Hubble, III et al. ................. | 250/353 |
| 4,808,565 | 2/1989 | Whitcomb et al. ................... | 503/211 |
| 4,816,386 | 3/1989 | Gotoh et al. ......................... | 430/495 |
| 4,853,362 | 8/1989 | Satake et al. ........................ | 503/209 |
| 5,019,549 | 5/1991 | Kellogg et al. ...................... | 430/200 |

Primary Examiner—Jack I. Berman
Assistant Examiner—Kiet T. Nguyen
Attorney, Agent, or Firm—Judith L. Byorick

[57] ABSTRACT

Disclosed is a process which comprises providing an imaging apparatus equipped with a path for moving receiver sheets through the apparatus and having infrared sensors situated along said path, incorporating into the imaging apparatus a substantially transparent receiver sheet having coated on at least a portion thereof an infrared absorbing material contained in a polymeric binder, passing the substantially transparent receiver sheet along the path, wherein the infrared sensors detect the presence of the infrared absorbing material on the substantially transparent receiver sheet, and generating an image on the substantially transparent receiver sheet. This process enables the use of substantially transparent receiver sheets in imaging apparatuses employing optical sensors or detectors for locating and/or positioning receiver sheets in the apparatus without the need for opaque strips on the transparencies or separate opaque sheets attached to the transparencies.

14 Claims, 3 Drawing Sheets

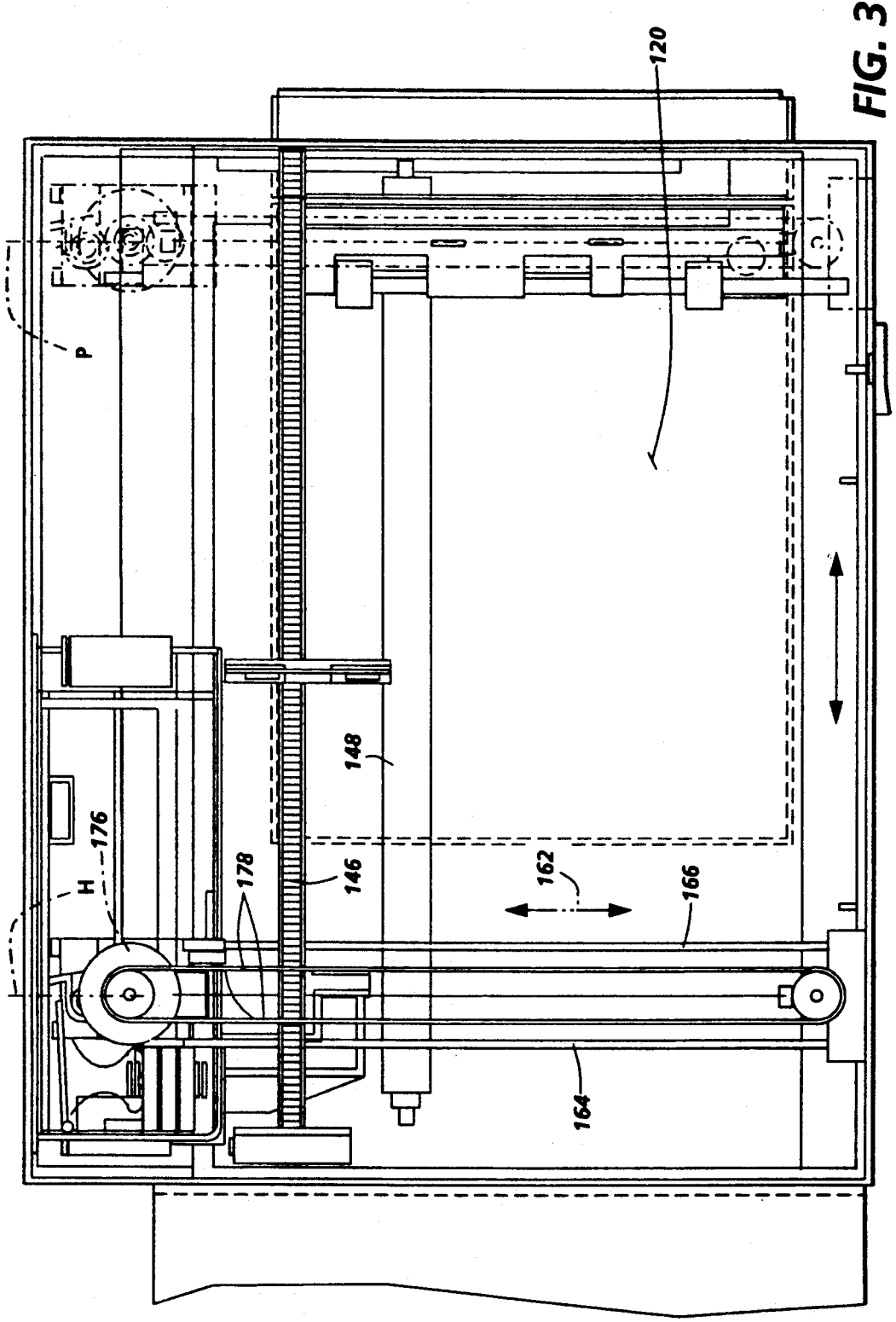

IMAGING PROCESS WITH INFRARED SENSITIVE TRANSPARENT RECEIVER SHEETS

BACKGROUND OF THE INVENTION

The present invention is directed to an imaging process. More specifically, the present invention is directed to an imaging process wherein images are generated on a transparent receiver sheet that is positioned in the imaging apparatus by infrared sensors that detect the presence of an infrared absorbing material situated in a specified location on the receiver sheet. One embodiment of the present invention is directed to a process which comprises providing an imaging apparatus equipped with a path for moving receiver sheets through the apparatus and having infrared sensors situated along said path, incorporating into the imaging apparatus a substantially transparent receiver sheet having coated on at least a portion thereof an infrared absorbing material contained in a polymeric binder, passing the substantially transparent receiver sheet along the path, wherein the infrared sensors detect the presence of the infrared absorbing material on the substantially transparent receiver sheet, and generating an image on the substantially transparent receiver sheet.

Apparatus and processes for sensing and positioning receiver sheets in imaging systems are known. For example, one type of paper sensing device takes the form of switches activated by switch arms located in the path of movement of the receiver sheet. Other sheet detection systems use photodetectors combined with light sources for sensing sheet presence or absence. It is often necessary to provide light baffles or other enclosures to ensure that the machine photosensitive surface does not come into light contact with the light sources of the sensors. U.S. Pat. No. 3,684,890 (Hayne et al.), the disclosure of which is totally incorporated herein by reference, discloses a misfeed detector for sensing the presence of a properly fed sheet of support material prior to the sheet being conveyed to the photoconductive surface of a xerographic machine for transfer of a developed image thereto. A photocell system utilizes two reflections from an area where both a sheet should be located and a gripper member is situated to determine whether a sheet is correctly positioned to be conveyed for an image transfer. If a misfeed of the sheet is detected by the photocells, a shutdown of the xerographic machine is effected. In addition, U.S. Pat. No. 3,882,308 (Daughton et al.), the disclosure of which is totally incorporated herein by reference, discloses a multiple sheet detecting system for use in a sheet feed path to provide a signal to a machine control when superposed sheets are fed past a detection station. The detection system has a source of illumination and photosensitive elements at the detection station. Illumination is interrupted by the presence of a sheet or sheets in the sheet path and also by a sample sheet such that a comparison is made between the sample and fed sheets. An electronic circuit coupled to the photosensitive elements which experience a change in resistance depending on the transmittance of a sheet or sheets in the sheet path generates an output signal when there is a multiple sheet condition. Also of interest with respect to photodetection devices is U.S. Pat. No. 3,932,755, the disclosure of which is totally incorporated herein by reference. Yet another system, as disclosed in, for example, U.S. Pat. No. 4,513,404 (Huggins), the disclosure of which is totally incorporated herein by reference, employs a single sensor transmitter and receiver connected to a pneumatic bus. The pneumatic bus includes a plurality of sensor locations or ports disposed at various points along the paper path in the imaging apparatus. The acoustic impedance characteristic at each port is modified by the absence or close proximity of a sheet of paper.

While most images are generated on opaque paper receiver sheets, it is frequently desirable to produce images on transparent receiver sheets so that the image can be projected in a magnified fashion to a screen for viewing by a large number of people. Difficulties are frequently encountered in attempting to feed transparent receiver sheets automatically through processing stations in imaging apparatuses because most machines employ photosensors or photodetectors to monitor the passage of receiver sheets through the machine. Since the transparency is transparent, it is not seen at particular places in the machine by the photosensors and photodetectors; accordingly, its progress is not satisfactorily monitored, and the timing of the various processing operations may then be inappropriate to the location of the transparency, resulting either in an imperfect or in a machine malfunction.

One technique that has been employed to solve this problem is to modify the transparent film by printing or coating an opaque material on a sheet in a location that will pass over the photosensors in the machine. Typically, this technique entails the use of a relatively narrow opaque strip along one edge of the transparent receiver sheet which permits the transparent film to run through a variety of machines with photosensors in different locations relative to the transparent sheet. This technique, however, suffers from the difficulty that placing the opaque stripe over the entire leading edge of the transparent film provides an opaque area that projects as black, and thus effectively limits the area of the transparency available for projection.

Another technique for solving this problem entails attaching a sheet of paper, plastic, or like material to the back of the transparent receiver sheet with a tape or an adhesive that permits easy removal of the opaque sheet before projection and after preparation of the image on the transparency. While this technique solves the photosensor problem, it also has several difficulties. Frequently, the adhesive or the tape used to affix the paper backing is incompletely removed from the transparent film with the paper backing sheet and the residual adhesive is visible on the projection, thus detracting from the viewing quality of the transparency. When the backing sheet is paper, it often expands and contracts its dimensions with changes in moisture from varying humidity conditions; this dimensional instability of the backing sheet relative to the more stable transparency film may give rise to composite curl that makes feeding difficult or creates wrinkles or jams as the sheet is processed in the machine. Finally, because the backing sheet may be attached only along one edge, the composite sheets are susceptible to mechanical separation by the forces associated with the feeding system of the machine. Separation can result in severe wrinkling of the paper or machine jams. In addition, a composite sheet of this type will not be suitable for use in machines employing multifeed detectors employing thickness sensors. The increased thickness of the composite sheet is sensed as a double sheet feed, and the sheet is aborted or the machine shuts down. Further, the low thermal conductivity and the relatively high thermal insulating property of the paper may prevent some of the available fusing energy from reaching the image when the transparency passes the fuser section of imaging apparatuses employing heat fusible toners to develop the image, thus resulting in inadequately fused images.

Examples of documents disclosing the aforementioned techniques for generating images on transparencies include U.S. Pat. No. 3,618,752, U.S. Pat. No. 3,519,124, U.S. Pat. No. 4,051,285, U.S. Pat. No. 3,944,710, U.S. Pat. No. 3,949,148, Japanese Patent Publication 57-76554A, and Japanese Patent Publication 57-122448, the disclosures of each of which are totally incorporated herein by reference.

The process of the present invention enables feeding of transparent receiver sheets through imaging apparatuses employing photodetectors or photosensors with none of the above disadvantages.

U.S. Pat. No. 4,808,565 (Whitcomb et al.), the disclosure of which is totally incorporated herein by reference, discloses thermographic materials that are colorless when unexposed but provide an intense dark image when thermally addressed. The materials comprise a transparent binder and at least two thermal reactants that react with each other at elevated temperatures. One of the reactants is in solid solution in a binder and the other is dispersed in microparticulate form in the binder. The materials can be used as coating and drying layers on a substrate such as sheets. The sheets give thermal images exhibiting good discrimination when examined with near-infrared radiation.

U.S. Pat. No. 4,816,386 (Gotoh et al.), the disclosure of which is totally incorporated herein by reference, discloses a near-infrared sensitive phthalocyanine polymer composition that comprises a substituted aluminum phthalocyanine and a polymer wherein substituted aluminum phthalocyanine dimers and/or dimer aggregates which are responsible for the near-infrared sensitivity are included. The compositions have optical properties which are capable of being chemically fixed. The compositions can be used for an optical information recording medium on which information can be recorded.

U.S. Pat. No. 4,853,362 (Satake et al.), the disclosure of which is totally incorporated herein by reference, discloses a heat sensitive recording material with a support and a color developing layer which comprises both as a colorless basic chromogenic dye at least one of a particular fluorane-type leuco dye and a particular divinyl compound and as a stabilizer a particular halogen substituted zinc benzoate derivative. The heat sensitive recording material exhibits optical readability in the near infrared region.

U.S. Pat. No. 4,553,033 (Hubble, III et al.), the disclosure of which is totally incorporated herein by reference, discloses an infrared sensor. More specifically, this patent discloses an integral compact infrared reflectance densitometer including a substrate supporting an LED, a control photodiode to compensate for component degradation, a background photodiode to compensate for background radiation, and a large area photodiode to provide an electrical signal representative of the amount of toner particles on the photosensitive surface. Also carried on the substrate is a field lens to focus light rays reflected from the photosensitive surface onto the signal photodiode. The substrate is precisely secured to a molded housing having integral collector and collimating lenses. Four extending pins on the housing engage four apertures on the substrate to locate the substrate with respect to the housing and align the LED and field lens carried on the substrate with the collector and collimating lenses of the housing. Also carried on the substrate is an aperture box to permit a portion of the LED light to project through the collimating lens to the photosensitive surface and a portion of the light to be reflected onto the control photodiode to control light output. The light rays reflected from the photosensitive surface are gathered in a collector lens and projected through the field lens to be focused onto the signal photodiode. An L-shaped clip and an appendage with an elongated aperture extend from opposite ends of the housing to position and align the infrared reflectance densitometer in the reproduction machine with respect to the photosensitive surface.

While known compositions and processes are suitable for their intended purposes, a need remains for processes for generating images on substantially transparent receiver sheets. In addition, a need remains for processes for using substantially transparent receiver sheets in imaging apparatuses that employ optical detection systems for determining the position of receiver sheets in the apparatus. Further, there is a need for processes for generating images on substantially transparent receiver sheets in imaging apparatuses that employ optical detection systems wherein the receiver sheet has no opaque portion, such as a strip, for the purpose of optical detection. Additionally, a need remains for processes for generating images on substantially transparent receiver sheets in imaging apparatuses that employ optical detection systems wherein the receiver sheet has no opaque additional sheet attached thereto. A need also exists for imaging processes with substantially transparent receiver sheets with maximized printing area in which the printed image can be situated for optical projection onto a screen. There is also a need for processes for generating images on substantially transparent receiver sheets in imaging apparatuses wherein the substantially transparent receiver sheets are coated in substantially the same location on all four edges with an infrared absorbing material contained in a polymeric binder, thereby enabling the sheet to be fed through the apparatus in any orientation. Further, there is a need for processes for generating images on substantially transparent receiver sheets in imaging apparatuses wherein the substantially transparent receiver sheets are coated with an infrared absorbing material contained in a polymeric binder in an encoded pattern and an infrared-sensitive scanning device in the apparatus detects and decodes the pattern and employs the information thus obtained to control registration of the image formed on the receiver sheet.

SUMMARY OF THE INVENTION

It is an object of the present invention to provide processes for generating images on substantially transparent receiver sheets.

It is another object of the present invention to provide processes for using substantially transparent receiver sheets in imaging apparatuses that employ optical detection systems for determining the position of receiver sheets in the apparatus.

It is yet another object of the present invention to provide processes for generating images on substantially transparent receiver sheets in imaging apparatuses that employ optical detection systems wherein the receiver sheet has no opaque portion, such as a strip, for the purpose of optical detection.

It is still another object of the present invention to provide processes for generating images on substantially transparent receiver sheets in imaging apparatuses that employ optical detection systems wherein the receiver sheet has no opaque additional sheet attached thereto.

Another object of the present invention is to provide imaging processes with substantially transparent receiver sheets with maximized printing area in which the printed image can be situated for optical projection onto a screen.

Yet another object of the present invention is to provide processes for generating images on substantially transparent receiver sheets in imaging apparatuses wherein the substantially transparent receiver sheets are coated in substantially the same location on all four edges with an infrared absorbing material contained in a polymeric binder, thereby enabling the sheet to be fed through the apparatus in any orientation.

Still another object of the present invention is to provide processes for generating images on substantially transparent receiver sheets in imaging apparatuses wherein the substantially transparent receiver sheets are coated with an infrared absorbing material contained in a polymeric binder in an encoded pattern and an infrared-sensitive scanning device in the apparatus detects and decodes the pattern and employs the information thus obtained to control registration of the image formed on the receiver sheet.

These and other objects of the present invention (or specific embodiments thereof) can be achieved by providing a process which comprises providing an imaging apparatus equipped with a path for moving receiver sheets through the apparatus and having infrared sensors situated along said path, incorporating into the imaging apparatus a substantially transparent receiver sheet having coated on at least a portion thereof an infrared absorbing material contained in a polymeric binder, passing the substantially transparent receiver sheet along the path, wherein the infrared sensors detect the presence of the infrared absorbing material on the substantially transparent receiver sheet, and generating an image on the substantially transparent receiver sheet.

BRIEF DESCRIPTION OF THE DRAWINGS

FIGS. 2 and 3 illustrate schematically another example of an imaging apparatus, specifically an ink jet imaging apparatus, suitable for the process of the present invention.

DETAILED DESCRIPTION OF THE PREFERRED EMBODIMENTS

Figure 1:
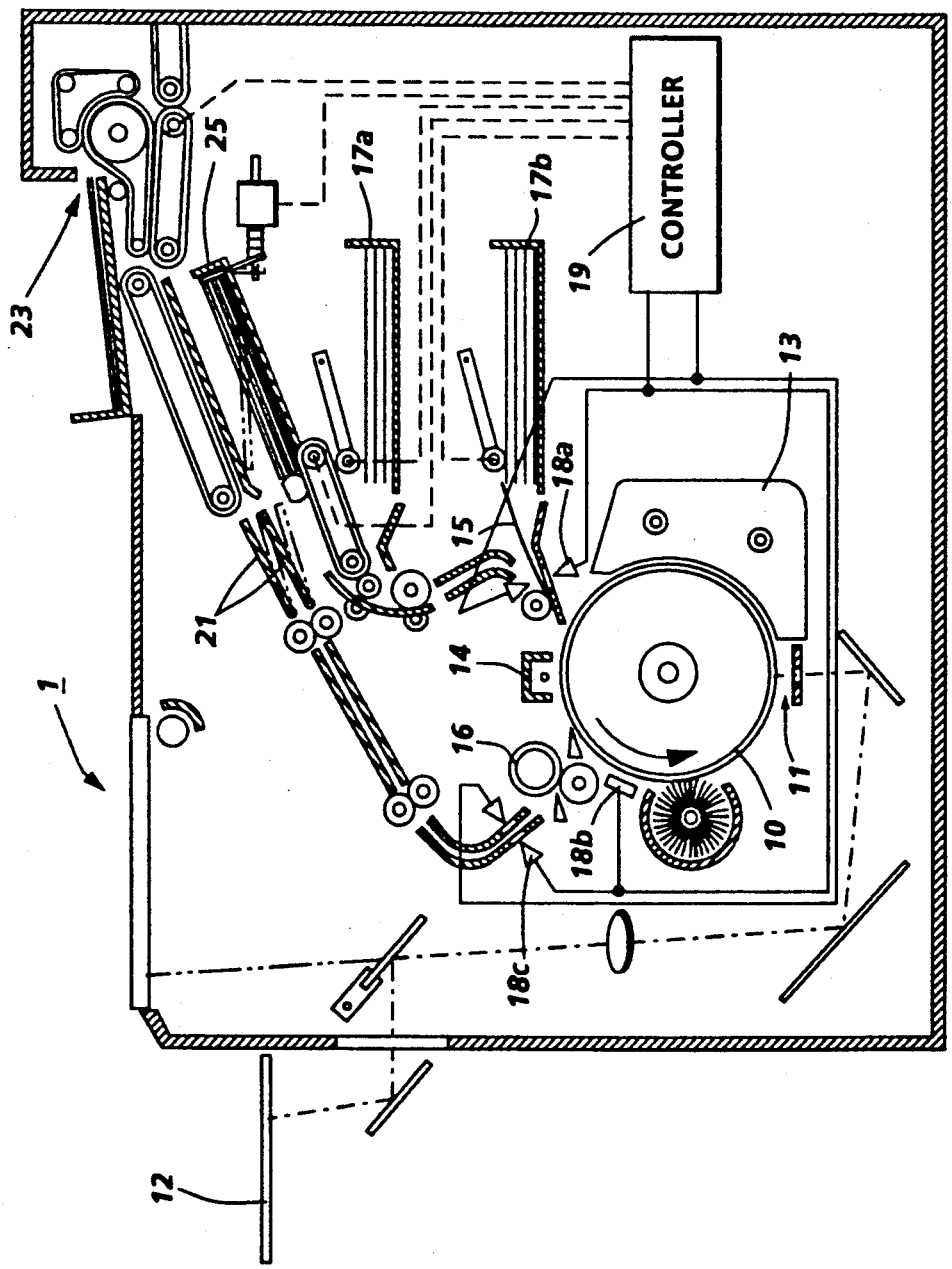
FIG. 1 illustrates schematically one example of an imaging apparatus, specifically an electrophotographic imaging apparatus, suitable for the process of the present invention.

Illustrated schematically in FIG. 1 is an electrophotographic imaging apparatus 1 incorporating the process of the present invention. Specifically, a photoreceptor 10 rotating in a counterclockwise direction rotates through an optic station 11 for projecting an image of an object on platen 12 onto the photoreceptor surface. Exposure of the charged photoreceptor to a light image results in formation of a latent image on the photoreceptor surface. Alternatively (not shown), instead of an optic station and a platen, imaging apparatus 1 can employ any other suitable means for generating a latent image on photoreceptor 10, such as a laser scanner coupled to a source of digital information. The photoreceptor 10 then rotates to a developing station 13, where charged toner particles develop the latent image to a visible image, and then to a transfer station 14 to transfer the developed image to one side of a substantially transparent receiver sheet 15 having coated on at least a portion thereof (such as a strip along an edge) an infrared absorbing material dispersed in a polymeric binder. The receiver sheet with the developed image is then fused at fusing station 16. Receiver sheets are provided from one of two receiver sheet trays 17a and 17b. Receiver sheet infrared detectors are disposed along the receiver sheet path at various locations, infrared detectors 18a, 18b, and 18c being representative. Infrared detectors 18a, 18b, and 18c are connected electrically to the controller 19. Detector 18b is reflective in nature and emits a beam of infrared radiation that reflects off the photoreceptor 10 back to the detector when no sheet is present. In operation, the receiver sheets from either tray 17a or 17b are conveyed along the receiver sheet path, past detector 18a prior to image transfer station to transfer station 14. After transfer, the receiver sheet is delivered to fuser 16 and then conveyed past detector 18c. A receiver sheet that fails to be guided into the fuser 16 and remains on the photoreceptor 10 is sensed by detector 18b. The receiver sheet bearing the fused image is then passed along the paper path to paper guides 21, where the receiver sheet continues to machine exit 23 when guides 21 are in the position represented by the solid lines. When guides 21 are in the position represented by the dotted lines, the receiver sheet is passed into duplex tray 25 and subsequently passed back to imaging member 10, where another image is deposited on the previously unimaged side of the sheet. It should be noted that the various infrared sensors can be provided throughout the machine to detect the presence or absence of any type of obstruction.

Figure 2:
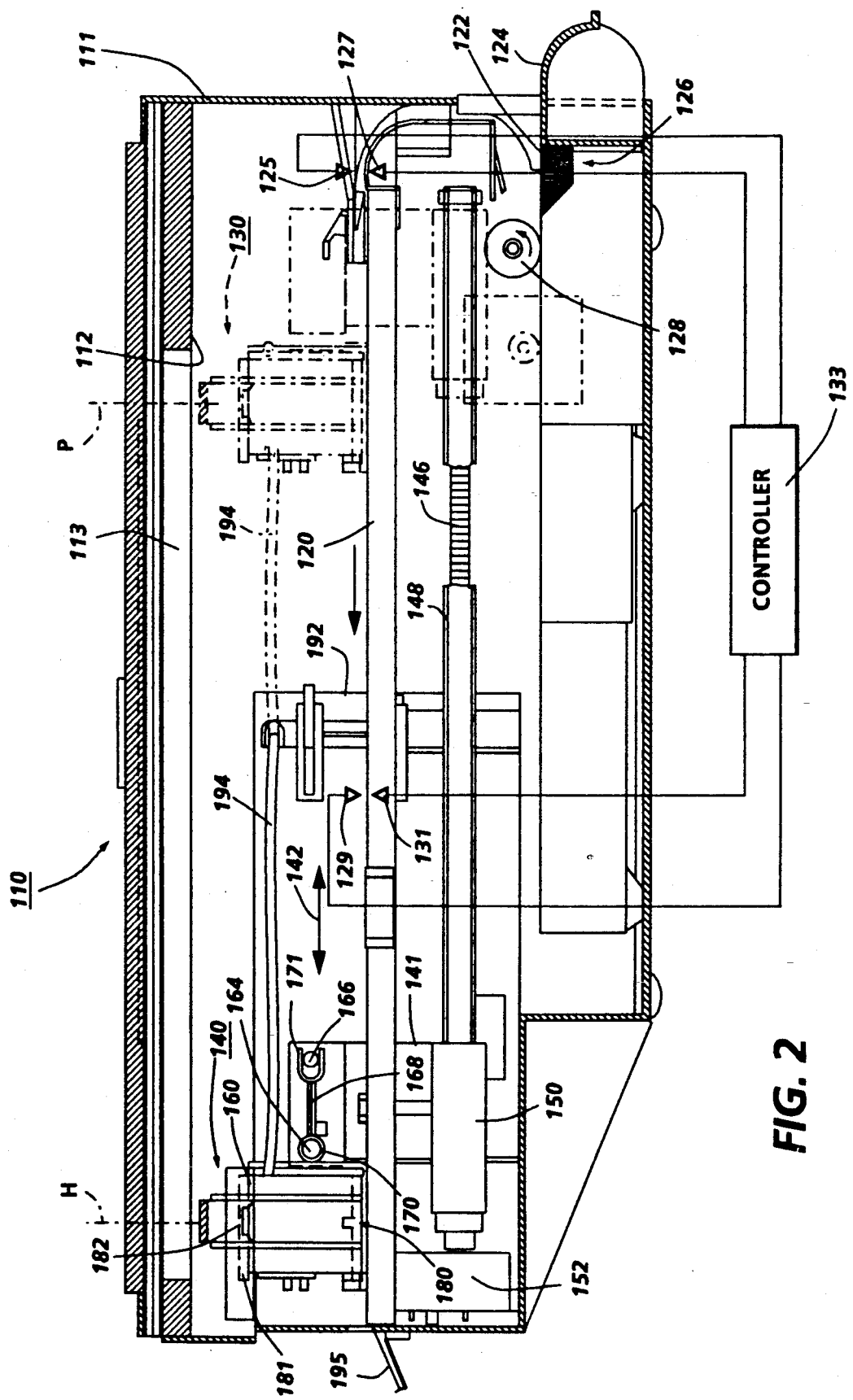

FIGS. 2 and 3 illustrate schematically a scanner in combination with a printer, the combination being referred to and identified herein as scanner-printer 110. Scanner-printer 110 has a frame structure or housing 111, including an upper surface 112 having inset therein a transparent glass scan platen 113 of preset size on which the document to be copied is placed.

In the ensuring description, "electronic fast scan direction" refers to the direction in which the scanning array 150 scans, "mechanical fast scan direction" refers to the direction perpendicular to the electronic fast scan direction in which the scan head 160 moves, and "mechanical slow scan direction" refers to the direction parallel to the electronic fast scan direction in which the scan carriage 140 moves. "Image line" (L) refers to the line parallel to the electronic fast scan direction, while "scan line" (SL) refers to the scan lines parallel to the mechanical fast scan direction.

A print platen 120 is located interiorly of housing 111 in predetermined spaced relation below scan platen 113, print platen 120 being in a plane substantially parallel to that of scan platen 113. Print platen 120 serves as a support for the copy substrate material, shown here as receiver sheets 122, on which the copy of the document is to be printed. A removable receiver sheet source in the form of a paper tray cassette 124 is slidably fitted into a slot-like opening provided in housing 111 below platen 120 adjacent the housing base, cassette 124 having therewithin a stack 126 of receiver sheets 122. The receiver sheets 122 are substantially transparent and have coated on at least a portion thereof an infrared absorbing material contained in a polymeric binder. A scuffing feed roll 128 serves, when actuated, to feed the topmost receiver sheet in stack 126 through a turnaround baffle 130 onto print platen 120.

A scan-print carriage 140 is supported for scanning movement in both the mechanical fast and slow scan directions in housing 111 between scan and print platens 113, 120 respectively. A slow scan base 141 supports a fast scan head 160 for reciprocating back and forth movement in the mechanical fast scan direction (shown by the double ended arrow 142), slow scan base 141 itself being supported by lead screw 146 proximate one side of slow scan base 141 and a cam member structure 148. Lead screw 146, which is drivingly coupled to slow scan base 141 by an internally threaded nut 150, is rotated by reversible motor 152 to selectively move slow scan base 141 and scan-print carriage 140 supported thereon back and forth in the mechanical slow scan direction at a controlled step scanning rate.

Carriage 140 also includes a fast scan head 160 supported on base 141 for reciprocating back and forth movement in the mechanical fast scan direction (shown by the dotted line arrow 162) by means of a cooperating journal rod 164 and support rod 166, fast scan head 160 having a side extension 168 with suitable openings 170, 171 within which rods 164, 166 are received. Carriage 140 is moved in the mechanical fast scan direction by a drive motor 176 mounted on carriage 140, motor 176 being drivingly coupled to carriage 140 by belt and pulley driver 178.

To scan and convert the image content of the document on platen 113 into image signals suitable for printing, a linear scanning array 180 such as a CCD is mounted on fast scan head 160 covered with a glass filter 181 such that the electronic fast scan direction of array 180 is perpendicular to the mechanical fast scan direction and parallel to the mechanical slow scan direction. A gradient index fiber lens array 182 focuses the individual photosensors or photosensitive elements of array 180 on scan platen 113 and the document resting thereon. Scanning array 180 has a preset number N of photosensors, array 180 together with lens array 182 being sized so as to scan a predetermined number N of pixels P. Because of the orientation of scanning array 180, each scan of array 180 also crosses a like-sized block of N image lines. At least one and perhaps two lamps (not shown) mounted on fast scan head 160 illuminate the scan line viewed by array 180 through lens array 182. Scanning array 180 overscans the number N of pixels P scanned by array 180 being larger than the number N' of pixels processed. As a result, each scan line SL includes a total overscanned area N-N', the number of pixels in each overscanned area being equal to N-N'/2.

A linear printing array (not shown), such as a thermal ink jet head, is mounted on carriage 140 below, facing platen 120, and in alignment with scanning array 180, the axis of the printing array also being perpendicular to the mechanical fast scan direction. The printing array has a number of printer elements, with the array being sized to print a block of pixels such that the number of pixels printed by the array in each print line is equal to the number of pixels processed from the scanning array 180. At the home position of the carriage (shown in solid lines) the fast scan head 160 docks in a maintenance position adapted to maintain the ink jet array openings and think therein a moistened condition. Additionally, the ink jet array is connected to a sump 192 of liquid ink to maintain the ink supply therein, via a supply tube 194.

A suitable control system (not shown) with operator control panel for inputting program instructions to scanner-printer 110 is provided.

During operation of scanner-printer 110, the document to be copied is placed in registered position on scan platen 113; scan-print carriage 140 being normally parked in the home position H. Receiver sheet feed roll 128 is actuated to feed a receiver sheet 122 into registered position adjacent print platen 120. Carriage 140 is driven by motor 152 via lead screw 146 in the slow scan direction (shown by the arrow 142) at a predetermined scanning rate to a start of pickup position P (shown in phantom). If copying to a blank sheet is desired, a blank sheet is advanced from the tray to a registered position at platen 120. At platen 120, a sheet grabbing arrangement (not shown) on carriage 140 grabs the sheet, and carries the lead edge of the sheet back to the home position at a registered position for printing. Receiver sheet infrared detectors are disposed along the receiver sheet path at various locations, infrared detectors 125, 127, 129, and 131 being representative. Detectors 125 and 127 indicate that a blank receiver sheet in position on platen 120 and detectors 129 and 131 indicate that a receiver sheet is positioned for printing. Infrared detectors 125, 127, 129, and 131 are connected electrically to the controller 133. With a blank sheet in position for printing, the carriage 140 is incrementally moved in the slow scan direction, and the head 160 is moved in the mechanical fast scan direction for image acquisition and printing during movement increments. Upon completion of the scanning motion in the slow scan direction, the carriage 140 is returned to the home position, from the pickup position P, picking up a second receiver sheet if required and simultaneously pushing the printed receiver sheet out to the machine with a sheet pushing member (not shown) into tray 195. As described, scanning array 180 scans in the electronic fast scan direction. It will be noted that there is some amount of overscanning in both the mechanical slow scan direction and the mechanical fast scan direction.

In scanner-printer 110, the printing array on carriage 140 may be actuated to substantially simultaneously print the block of image lines scanned by array 180 on the receiver sheet 122 resting on print platen 120.

A scanner printer similar to that in FIGS. 2 and 3 is disclosed in U.S. Pat. No. 5,018,025 (Herloski), the disclosure of which is totally incorporated herein by reference.

The present invention is also suitable for other imaging devices, including ink jet printers with no scanning components, electrographic or ionographic imaging apparatuses, and the like.

The transparent receiver sheets employed in the process of the present invention generally comprise a base sheet and, if necessary, an ink receptive coating. The base sheet can be any substantially transparent material suitable for receiving images. Examples include transparent materials, such as polyester, including Mylar TM, available from E.I. Du Pont de Nemours & Company, Melinex TM, available from Imperial Chemicals, Inc., Celanar TM, available from Celanese Corporation, polycarbonates such as Lexan TM, available from General Electric Company, polysulfones, cellulose triacetate, polyvinylchloride cellophane, polyvinyl fluoride, and the like, with polyester such as Mylar TM being preferred in view of its availability and relatively low cost. Typical thicknesses for the base sheet are from about 50 to about 125 microns, and preferably from about 100 to about 125 microns, although the thickness can be outside this range.

The ink receiving layer or layers of the receiver sheets are selected to be compatible with the material from which images will be formed on the recording sheet. For example, when the recording sheet is intended for use in ink jet printing processes, the ink receiving layer or layers are of a material that will enable formation of high quality images with the ink used in the process, which typically is an aqueous based ink. When the recording sheet is intended for use in electrophotographic, ionographic, or electrographic printing processes, the ink receiving layer or layers are of a material compatible with the toner employed to develop the images, which may be either a dry toner or a liquid toner, and which typically is hydrophobic. Examples of coating materials suitable for recording sheets for printing processes employing aqueous based inks include hydrophilic materials, such as binary blends comprising poly(ethylene oxide), such as POLYOX TM WSRN-3000, available from Union Carbide Company, preferably in an amount of from about 10 to about 90 percent by weight, and a component, preferably in an amount of from about 10 to about 90 percent by weight, selected from the group consisting of: (1) hydroxypropyl methyl cellulose, such as Methocel TM K35LV, available from Dow Chemical Company; (2) vinylmethyl ether/maleic acid copolymers, such as Gantrez TM S-95, available from GAF Corporation; (3) acrylamide/acrylic acid copolymers, available from Scientific Polymer Products; (4) salts of carboxymethylhydroxyethyl cellulose, such as sodium carboxymethylhydroxyethyl cellulose, such as CMHEC43H TM and 37L TM, available from Hercules Chemical Company (CMHEC 43H TM is believed to be a high molecular weight polymer with carboxymethyl cellulose CMC/hydroxyethyl cellulose (HEC) ratio of 4:3, CMHEC 37L TM is believed to be a low molecular weight polymer with CMC/HEC ratio of 3:7); (5) hydroxyethyl cellulose, such as Natrosol 250LR, available from Hercules; (6) water soluble ethylhydroxyethyl cellulose, such as Bermocoll TM, available from Berol Kem, AB, Sweden; (7) cellulose sulfate, available from Scientific Polymer Products; (8) poly(vinyl alcohol), available from Scientific Polymer Products; (9) poly(vinyl pyrrolidone), available from GAF Corporation; (10) hydroxybutylmethyl cellulose, available from Dow Chemical Company; (11) hydroxypropyl cellulose, such as Klucel TM Type E, available from Hercules; (12) poly(2-acrylamido-2-methyl propane sulfonic acid), available from Scientific Polymer Products; (13) methyl cellulose, available from Dow Chemical Company; (14) hydroxyethylmethyl cellulose, such as HEM, available from British Celanese Ltd., and Tylose MH, MHK from Kalle A.G.; (15) cellulose acetate, available from Scientific Polymer Products; (16) cellulose acetate hydrogen phthalate, such as CAP, available from Eastman Kodak Company; (17) hydroxypropylmethyl cellulose phthalate, such as HPMCP, available from Shin-Etsu Chemical; (18) vinylalcohol/vinylacetate copolymers, available from Scientific Polymer Products; (19) vinylalcohol/vinylbutyral copolymers, available from Scientific Polymer Products; (20) salts of carboxymethyl cellulose, such as sodium carboxymethyl cellulose, such as CMC Type 7HOF, available from Hercules Chemical Company; and (21) vinyl pyrrolidone/vinyl acetate copolymers, available from Scientific Polymer Products. Also suitable are ternary blends comprising poly(ethylene oxide), preferably in an amount of from about 10 to about 50 percent by weight, salts of carboxymethyl cellulose, such as sodium carboxymethyl cellulose, preferably in an amount of from about 5 to about 85 percent by weight, and a component, preferably in an amount of from about 5 to about 45 percent by weight, selected from the group consisting of (1) hydroxypropyl methyl cellulose, such as Methocel TM K35LV, available from Dow Chemical Company; (2) vinylmethyl ether/maleic acid copolymers, such as Gantrez TM S-95, available from GAF Corporation; (3) acrylamide/acrylic acid copolymers, available from Scientific Polymer Products; (4) salts of carboxymethylhydroxyethyl cellulose, such as sodium carboxymethylhydroxyethyl cellulose, such as CMHEC43H TM, 37L, available from Hercules Chemical Company; (5) hydroxyethyl cellulose, such as Natrosol TM 250LR, available from Hercules; (6) water soluble ethylhydroxyethyl cellulose, such as Bermocoll TM, available from Berol Kem, AB, Sweden; (7) cellulose sulfate, available from Scientific Polymer Products; (8) poly(vinyl alcohol), available from Scientific Polymer Products; (9) poly(vinyl pyrrolidone), available from GAF Corporation; (10) hydroxybutylmethyl cellulose, available from Dow Chemical Company; (11) hydroxypropyl cellulose, such as Klucel TM Type E, available from Hercules; (12) poly(2-acrylamido-2-methyl propane sulfonic acid), available from Scientific Polymer Products; (13) methyl cellulose, available from Dow Chemical Company; (14) hydroxyethylmethyl cellulose, such as HEM available from British Celanese Ltd., and Tylose TM MH, MHK from Kalle A. G.; (15) poly(diethylene triamine-co-adipic acid), available from Scientific Polymer Products; (16) poly(imidazoline) quaternized, available from Scientific Polymer Products; (17) poly(ethylene imine) epichlorohydrin modified, available from Scientific Polymer Products; (18) poly(N,N dimethyl-3,5-dimethylene piperidinium chloride), available from Scientific Polymer Products; and (19) poly(ethylene imine) ethoxylated, available from Scientific Polymer Products. Also suitable are ternary blends of poly(ethylene oxide), preferably in an amount of from about 10 to about 50 percent by weight, hydroxyalkylmethyl cellulose (wherein the alkyl group generally has from 1 to about 10 carbon atoms, such as ethyl, propyl or butyl), preferably in an amount of from about 5 to about 85 percent by weight, and a component, preferably in an amount of from about 5 to about 45 percent by weight, selected from the group consisting of (1) hydroxypropyl cellulose, such as Klucel TM Type E, available from Hercules; (2) vinylmethyl ether/maleic acid copolymers, such as Gantrez TM S-95, available from GAF Corporation; (3) acrylamide/acrylic acid copolymers, available from Scientific Polymer Products, (4) salts of carboxymethylhydroxyethyl cellulose, such as sodium carboxymethylhydroxyethyl cellulose, such as CMHEC43H TM, 37L, available from Hercules Chemical Company; (5) hydroxyethyl cellulose, such as Natrosol 250LR, available from Hercules Chemical Company; (6) water soluble ethylhydroxyethyl cellulose, such as Bermocoll TM, available from Berol Kem, AB, Sweden; (7) cellulose sulfate, available from Scientific Polymer Products; (8) poly(vinyl alcohol), available from Scientific Polymer Products; (9) poly(vinyl pyrrolidone), available from GAF Corporation; (10) poly(2-acrylamido-2-methyl propane sulfonic acid), available from Scientific Polymer Products; (11) methyl cellulose, available from Dow Chemical Company; (12) salts of carboxymethyl cellulose, such as sodium carboxymethyl cellulose, such as CMC 7HOF TM, available from Hercules Chemical Company; (13) poly(diethylene triamine-co-adipic acid), available from Scientific Polymer Products; (14) poly(imidazoline) quaternized, available from Scientific Polymer Products; (15) poly(ethylene imine) epichlorohydrin modified, available from Scientific Polymer Products; (16) poly(N,N-dimethyl-3,5-dimethylene piperidinium chloride), available from Scientific Polymer Products; and (17) poly(ethylene imine) ethoxylated, available from Scientific Polymer Products.

Illustrative specific examples of binary (two polymers) and ternary (three polymers) blends suitable as ink receiving layers for printing processes employing aqueous based inks include binary blends of hydroxyethylmethyl cellulose, 75 percent by weight, and poly(ethylene oxide), 25 percent by weight; binary blends of hydroxypropylmethyl cellulose, 80 percent by weight, and poly(ethylene oxide), 20 percent by weight; binary blends of hydroxybutylmethyl cellulose, 70 percent by weight, and poly(ethylene oxide), 30 percent by weight; binary blends of sodium carboxymethyl cellulose, 80 percent by weight, and poly(ethylene oxide), 20 percent by weight; ternary blends of hydroxyalkylmethyl cellulose, 50 percent by weight, sodium carboxymethyl cellulose, 25 percent by weight, and poly(ethylene oxide), 25 percent by weight; ternary blends of hydroxyalkylmethyl cellulose, 60 percent by weight, poly(ethylene oxide), 20 percent by weight, and poly(N,N-dimethyl-3,5-dimethylene piperidinium chloride), 20 percent by weight; and ternary blends of hydroxypropylmethyl cellulose, 50 percent by weight, poly(ethylene oxide), 25 percent by weight, and sodium carboxymethyl cellulose, 25 percent by weight, and the like. Binary blends of hydroxypropylmethyl cellulose, 80 percent by weight, and poly(ethylene oxide), 20 percent by weight, are preferred in some embodiments as these yield images of high optical density (when, for example imaged in Xerox® 4020 TM ink jet printers), such as 1.15 (black), 1.44 (magenta), 0.84 (cyan) and 0.57 (yellow), which images are resistant to humidity, for example between 20 to 80 percent humidity at 80° F. Further examples of coating materials compatible with aqueous based inks are disclosed in, for example, U.S. Pat. No. 4,528,242, U.S. Pat. No. 4,547,405, U.S. Pat. No. 4,555,437, U.S. Pat. No. 4,575,465, U.S. Pat. No. 4,578,285, U.S. Pat. No. 4,592,954, U.S. Pat. No. 4,649,064, U.S. Pat. No. 4,781,985, U.S. Pat. No. 4,887,097, U.S. Pat. No. 4,474,850, U.S. Pat. No. 4,650,714, U.S. Pat. No. 4,732,786, U.S. Pat. No. 4,775,594, U.S. Pat. No. 4,308,542, U.S. Pat. No. 4,269,891, U.S. Pat. No. 4,371,582, U.S. Pat. No. 4,301,195, U.S. Pat. No. 4,503,111, U.S. Pat. No. 4,686,118, U.S. Pat. No. 4,701,837, U.S. Pat. No. 4,770,934, U.S. Pat. No. 4,466,174, U.S. Pat. No. 4,371,582, U.S. Pat. No. 4,680,235, U.S. Pat. No. 4,711,816, and U.S. Pat. No. 4,830,911, the disclosures of each of which are totally incorporated herein by reference.

Examples of coating materials suitable for electrophotographic, ionographic, or electrographic imaging processes employing dry or liquid toners include hydrophobic materials, such as blends of poly($\alpha$-methyl styrene) (molecular weight M between $10^3$ and $10^5$, available from Amoco as resin 18-290), preferably in an amount of from about 5 to about 95 percent by weight, and a component, preferably in an amount of from about 5 to about 95 percent by weight, selected from the group consisting of (1) poly(ethylene oxide), such as POLY OX-WSRN TM 3000, available from Union Carbide Company; (2) halogenated (such as chlorinated, brominated, fluorinated, iodated, or the like) rubber, such as a rubber with a chlorine content of about 65 percent, available from Scientific Polymer Products; (3) halogenated (such as chlorinated, brominated, fluorinated, iodated, or the like) poly(propylene), such as a polypropylene with a chlorine content of about 65 percent by weight, available from Scientific Polymer Products; (4) halogenated (such as chlorinated, brominated, fluorinated, iodated, or the like) poly(ethylene), such as a polyethylene with a chlorine content of about 48 percent by weight, available from Scientific Polymer Products; (5) poly(caprolactone), such as PLC-700 TM, available from Union Carbide Company; (6) poly(chloroprene), available from Scientific Polymer Products; (7) poly(1,4-butylene adipate), available from Scientific Polymer Products; (8) poly(vinylmethylether), such as Lutonal TM M-40, available from BASF; (9) poly(vinylisobutylether), such as Lutonal TM 160, available from BASF; (10) styrene-butadiene copolymers, such as Kraton TM 1102 and Kraton TM 1652, available from Shell Company; and (11) ethyl cellulose, such as Ethocel TM Type-N, available from Hercules Chemical Company. Specific examples of binary blends suitable as toner or ink receiving layer materials for electrophotographic, ionographic, or electrographic imaging include blends of poly($\alpha$-methyl styrene) in an amount of about 80 percent by weight and poly(chloroprene) in an amount of about 20 percent by weight; blends of chlorinated rubber in an amount of about 80 percent by weight and poly($\alpha$-methyl styrene) in an amount of about 20 percent by weight; blends of poly($\alpha$-methyl styrene) in an amount of about 20 percent by weight and styrene-butadiene copolymer in an amount of about 80 percent by weight; and blends of poly($\alpha$-methyl styrene) in an amount of about 20 percent by weight and ethyl cellulose in an amount of about 80 percent by weight. Blends of poly($\alpha$-methyl styrene) with chloroprene or ethyl cellulose or chlorinated rubber are often preferred, as recording sheets coated with these polymers and imaged with a Xerox® 1005 TM color copier yield high optical density images of, for example, 1.6 (black), 1.40 (magenta), 1.50 (cyan), and 0.80 (yellow), which could not be lifted off with 3M scotch tape 60 seconds subsequent to their preparation. Further examples of coating materials compatible with dry and liquid toners are disclosed in, for example, U.S. Pat. No. 3,320,089, U.S. Pat. No. 3,488,189, U.S. Pat. No. 3,493,412, U.S. Pat. No. 3,535,112, U.S. Pat. No. 3,539,340, U.S. Pat. No. 3,539,341, U.S. Pat. No. 3,619,279, U.S. Pat. No. 3,833,293, U.S. Pat. No. 3,841,903, U.S. Pat. No. 3,854,942, U.S. Pat. No. 4,071,362, U.S. Pat. No. 4,085,245, U.S. Pat. No. 4,234,644, U.S. Pat. No. 4,259,422, U.S. Pat. No. 4,370,379, U.S. Pat. No. 4,419,004, U.S. Pat. No. 4,419,005, U.S. Pat. No. 4,480,003, U.S. Pat. No. 4,489,122, U.S. Pat. No. 4,526,847, and U.S. Pat. No. 4,599,293, the disclosures of each of which are totally incorporated herein by reference.

The ink receiving layer or layers can be of any effective thickness. Typical thicknesses are from about 1 to about 25 microns, and preferably from about 5 to about 15 microns, although the thickness can be outside this range. In addition, the ink receiving layer can optionally contain filler materials, such as inorganic oxides, including silicon dioxide, titanium dioxide (rutile), and the like, colloidal silicas, such as Syloid TM 74 available from W. R. Grace & Company, calcium carbonate, or the like, as well as mixtures thereof, in any effective amount. Typical amounts of fillers are from about 1 to about 25 percent by weight of the coating composition, and preferably from about 2 to about 10 percent by weight of the coating composition, although the amount can be outside this range. When it is desired that the receiver sheet be transparent, the filler typically is present in an amount of up to about 3 percent by weight. Filler components may be useful as a slip component for feeding the receiver sheet through a printing or imaging apparatus, since addition of the filler renders the sheet surface discontinuous, thereby imparting roughness to the surface and making it easy to grip in a machine equipped with pinch rollers. In addition, fillers such as silica can enhance color mixing when primary colors are mixed to form secondary colors, particularly in ink jet printing process.

The receiver sheets employed in the process of the present invention also contain on at least a portion thereof an infrared absorbing material dispersed in a polymeric binder. The infrared absorbing material can be situated either on the surface of the receiver sheet upon which ink or toner will be applied to form an image or on the surface of the receiver sheet opposite to the image-receiving surface. The infrared absorbing material can be coated onto either surface of a prepared substantially transparent receiver sheet. Alternatively, the infrared absorbing material can be applied to the base sheet of the receiver sheet during the sheet preparation process, and additional layers, such as the ink or toner receiving layers or anticurl back layers, can then be coated onto the infrared absorbing material; in this instance, the layers situated on top of the infrared absorbing material offer a degree of protection to the infrared absorbing material against chipping, flaking, or other damage. The area of the receiver sheet coated with the infrared absorbing material is generally determined by the timing requirements of the optical sensors in the imaging apparatus in which the receiver sheet will be used. Typical edge coating widths for feed and transport timing are from about ⅛ inch to about 9/16 inch on an edge. Depending on the sophistication of the sensor mechanism, the infrared absorbing material can be applied to one edge of the receiver sheet, to more than one edge of the receiver sheet, to a specific location on the receiver sheet (such as a spot in one corner), or the like. In addition, the entire receiver sheet can be coated with the infrared absorbing material as a uniform layer. The infrared absorbing material/binder mixture is coated onto the receiver sheet in any effective thickness. Typical thicknesses are from about 2 to about 10 microns, although the thickness can be outside of this range.

Any substantially transparent polymeric material capable of adhering to the receiver sheet and having dissolved or dispersed therein an infrared-sensitive material can be used. A variety of polymeric binders can be employed, both in solution and in the form of an aqueous dispersion or emulsion. Most typical binders offer solubility in common coating vehicles and exhibit good durability of finish. Examples of suitable polymeric binders include acrylate polymers and copolymers and methacrylate polymers and copolymers, such as methyl methacrylate polymers and copolymers, ethylmethacrylate polymers and copolymers, and the like. Styrene/diolefin copolymers, such as styrene-butadiene copolymers, are also suitable. Specific examples include poly(ethylmethacrylate), such as Elvacite #2042, available from E.I. Du Pont de Nemours & Company, Elvacite #2028, a methacrylate copolymer also available from E.I. Du Pont de Nemours & Company, the "Rhoplex" methacrylate/acrylate series, available from Rohm & Haas, Inc., and the like. Materials such as poly(ethylmethacrylate) exhibit excellent coating compatibility with many ink receptive formulations employed in transparency materials. Elvacite #2028 is particularly useful for formulations coated from alcohol solutions and the Rhoplex materials are particularly useful for coating aqueous emulsions.

Any suitable infrared sensitive material capable of being dissolved or dispersed in the binder material can be used. Both narrow and broad absorbers in the wavelength range of from about 700 to about 900 nanometers are suitable. Examples of suitable infrared sensitive materials include the "Pro-Jet" IR series of materials, available from ICI Fine Chemicals Division, infrared absorbing materials such as Oxazine 725, available from Exiton, infrared absorbing materials such as those available from Lambda Physics Inc., Bedford, MA, and the like.

The binder/IR sensitive material mixture contains the ingredients in any effective amounts. Typically, in a solution containing the binder and infrared sensitive material, the binder is present in an amount of from about 5 to about 25 percent by weight, preferably from about 10 to about 20 percent by weight, and the infrared sensitive material is present in an amount of from about 0.05 to about 2.0 percent by weight, preferably from about 0.2 to about 0.8 percent by weight, with the balance comprising the solvent, although amounts outside of this range can be used.

The receiver sheets for the process of the present invention can be prepared by any suitable method. For example, the coatings can be applied by a number of known techniques, including melt extrusion, reverse roll, solvent extrusion, and dip coating processes. In dip coating, a web of material to be coated is transported below the surface of the coating material by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material is transferred from a steel applicator roll onto the web material to be coated. The metering roll is stationary or is rotating slowly in the direction opposite to that of the applicator roll. In slot extrusion coating, a flat die is used to apply coating materials with the die lips in close proximity to the web of material to be coated. Once the desired amount of coating has been applied to the web, the coating is dried at 25° to 100° C. in an air drier. In melt extrusion, an extruder converts solid pellets or powder of thermoplastic resin into a uniform bubble-free melt at the required temperature, and this melt is extruded through a flat die vertically downward into the nip of the coating rolls where it is deposited on the web of the material to be coated in the form of a film. After cooling, the film is laminated to the web material. An extrusion coater can be used to prepare receiver sheets by coating a polyester base sheet with fluoro polymers that are not soluble in common solvents.

Any suitable infrared detectors or sensors can be incorporated into the imaging apparatus employed for the process of the present invention. Examples of suitable infrared detectors or sensors include the optical registration sensors situated along the paper paths of commercially available imaging devices such as the Xerox® 5090, the Xerox® 1090, the Xerox® 1075, the Xerox® 4090, the Xerox® 4050, the Xerox® Docutech®, and the like. Typically, the infrared sensors will have output sources in the light wavelength range of from about 600 to about 1,000 nanometers. Any other suitable infrared detectors or sensors can also be employed.

The infrared sensors or detectors can be situated at any desired location along the path of movement of the substantially transparent receiver sheet through the imaging apparatus. For example, the sensors or detectors can be situated at the feeder exit area, where the receiver sheets are fed from the feeding area into the imaging apparatus, at the pretransfer and/or transfer sites in an electrophotographic apparatus, at the location where the developed image is transferred from the imaging member to the receiver sheet, in an ink jet printer at the location in the apparatus where the ink is applied to the receiver sheet, at the location where the receiver sheet exits the imaging apparatus and is placed in a document stacker, or the like.

The present invention also includes printing and imaging processes with recording sheets of the present invention. One embodiment of the present invention is directed to a process for generating images which comprises generating an electrostatic latent image on an imaging member in an imaging apparatus, developing the latent image with a toner, transferring the developed image to a recording sheet of the present invention, and optionally permanently affixing the transferred image to the recording sheet. The electrostatic latent image can be created on a photosensitive imaging member by the well known electrophotographic process, as described in, for example, U.S. Pat. No. 2,297,691 to Chester Carlson. In addition, the electrostatic latent image can be created on a dielectric imaging member by an ionographic process, which entails applying a charge pattern imagewise to an imaging member, developing the image with a toner, and transferring the developed image to a recording sheet. Further, the recording sheet of the present invention can be employed in electrographic printing processes, which entail generating an electrostatic latent image on a recording sheet of the present invention, developing the latent image with a toner, and optionally permanently affixing the developed image to the recording sheet. Ionographic and electrographic processes are well known, and are described in, for example, U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference.

The recording sheets of the present invention can also be employed in ink jet printing processes. Generally, this embodiment of the present invention is directed to a printing process which comprises (1) incorporating into an ink jet printing apparatus containing an ink a recording sheet of the present invention and causing droplets of the ink to be ejected in an imagewise pattern onto the recording sheet, thereby generating images on the recording sheet. Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. One type of drop-on-demand system has as its major components an ink filled channel or passageway having a nozzle on one end and a piezoelectric transducer near the other end to produce pressure pulses. Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording sheet. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

The recording sheets can be used in any other printing or imaging process, such as printing with pen plotters, handwriting with ink pens (either aqueous or nonaqueous based inks), offset printing processes, or the like, provided that the ink employed to form the image is compatible with the material selected as the ink receiving layer of the recording sheet.

The transparencies of the present invention can also be used in processes wherein the infrared sensitive material contained in the binder is placed on the receiver sheet in an encoded pattern, such as a bar code, and wherein the imaging apparatus is equipped with sensors and controllers that detect and decode the pattern and employ the information imparted by the pattern to control the imaging process. Apparatuses and processes wherein machine processes are controlled by invisible markings on receiver sheets are disclosed in copending application U.S. Ser. No. 07/636,264, entitled "Method of Storing Information Within a Reprographic System," with the named inventor Joseph D. Wright, filed Dec. 31, 1990, the disclosure of which is totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A coating solution was prepared by dissolving 10 grams of Elvacite #2028 binder resin, obtained from E. I. Du Pont de Nemours & Company, in 90 grams of ethyl alcohol and adding to this solution a solution of 0.1 grams of ICI Pro-Jet #S116510/2 narrow band infrared absorbing dye, obtained from ICI Fine Chemicals, in 4 grams of ethyl alcohol. The solution was stirred and a coating of the solution was applied in a three inch wide strip to one edge of a Xerox ® 3R3117 transparency sheet by the hand draw-down method using a #10 Meyer rod, followed by air drying to constant weight. The transparency thus prepared was incorporated into an optical sensing test fixture equipped with sensing circuitry from a Xerox ® 1075 copier and the transparency was passed along the paper path in the machine. The transparency with the colorless infrared coating strip was sufficient to trigger the optical sensors in each location. Sheet detection thresholds were correlated with absorbance measurements by preparing additional transparencies according to the method described in this Example with various concentrations of infrared sensitive material in the binder, ranging from 0.04 gram to 0.5 gram of infrared sensitive material per 10 grams of binder. A concentration of 0.1 gram of infrared sensitive dye in 10 grams of binder was sufficient to trigger the infrared sensors in this instance.

EXAMPLE II

A coating solution was prepared by dissolving 20 grams of Elvacite #2028 binder resin, obtained from E.I. Du Pont de Nemours & Company, in 90 grams of ethyl alcohol and adding to this solution a solution of 1.0 gram of ICI Pro-Jet #S116510/2 narrow band infrared absorbing dye, obtained from ICI Fine Chemicals, in 4 grams of ethyl alcohol. The solution was stirred and a coating of the solution was applied in a three inch wide strip to one edge of a Xerox ® 3R3117 transparency sheet by the hand draw-down method using a #14 Meyer rod, followed by air drying to constant weight. The transparency thus prepared was incorporated into an optical sensing test fixture equipped with sensing circuitry from a Xerox ® 1075 copier and the transparency was passed along the paper path in the machine. The transparency with the colorless infrared coating strip was sufficient to trigger the optical sensors in each location.

EXAMPLE III

A coating solution was prepared by dissolving 10 grams of Elvacite #2042 binder resin, obtained from E.I. Du Pont de Nemours & Company, in 45 grams of methyl ethyl ketone and 45 grams of ethyl acetate and adding to this solution a solution of 0.2 gram of ICI Pro-Jet #S109186 broad band infrared absorbing dye, obtained from ICI Fine Chemicals, in 10 grams of methyl ethyl ketone. The solution was stirred and a coating of the solution was applied in a three inch wide strip to one edge of a 4 mil thick ICI Melinex polyester substrate by the hand draw-down method using a #14 Meyer rod, followed by air drying to constant weight. The transparency thus prepared was characterized spectrally by reflectance measurement at 550 nanometers and absorbance measurement at 890 nanometers. The transparency thus prepared was incorporated into an optical sensing test fixture equipped with sensing circuitry from a Xerox ® 1075 copier and the transparency was passed along the paper path in the machine. The transparency with the colorless infrared coating strip was sufficient to trigger the optical sensors in each location.

EXAMPLE IV

A coating solution was prepared by dissolving 15 grams of Elvacite #2042 binder resin, obtained from E.I. Du Pont de Nemours & Company, in 45 grams of methyl ethyl ketone and 45 grams of ethyl acetate and adding to this solution a solution of 1.0 gram of ICI Pro-Jet #S109186 broad band infrared absorbing dye, obtained from ICI Fine Chemicals, in 10 grams of methyl ethyl ketone. The solution was stirred and a coating of the solution was applied in a three inch wide strip to one edge of a 4 mil thick ICI Melinex polyester substrate by the hand draw-down method using a #14 Meyer rod, followed by air drying to constant weight. The transparency thus prepared was characterized spectrally by reflectance measurement at 550 nanometers and absorbance measurement at 890 nanometers. The transparency thus prepared was incorporated into an optical sensing test fixture equipped with sensing circuitry from a Xerox ® 1075 copier and the transparency was passed along the paper path in the machine. The transparency with the colorless infrared coating strip was sufficient to trigger the optical sensors in each location.

Other embodiments and modifications of the present invention may occur to those skilled in the art subsequent to a review of the information presented herein; these embodiments and modifications, as well as equivalents thereof, are also included within the scope of this invention.

What is claimed is:

1. A process which comprises providing an imaging apparatus equipped with a path for moving receiver sheets through the apparatus and having infrared sensors situated along said path, incorporating into the imaging apparatus a substantially transparent receiver sheet having coated on at least a portion thereof an infrared absorbing material contained in a polymeric binder, passing the substantially transparent receiver sheet along the path, wherein the infrared sensors detect the presence of the infrared absorbing material on the substantially transparent receiver sheet, and generating an image on the substantially transparent receiver sheet.

2. A process according to claim 1 wherein the infrared absorbing material and polymeric binder are present in relative amounts of from about 5 to about 25 parts by weight of the infrared absorbing material and from about 0.05 to about 2 parts by weight of the polymeric binder.

3. A process according to claim 1 wherein the infrared absorbing material is a dye.

4. A process according to claim 1 wherein the polymeric binder is selected from the group consisting of methyl methacrylate polymers, methyl methacrylate copolymers, ethyl methacrylate polymers, ethyl methacrylate copolymers, styrene/diolefin copolymers, and mixtures thereof.

5. A process according to claim 1 wherein the polymeric binder and infrared absorbing material are coated onto the substantially transparent receiver sheet in a thickness of from about 2 to about 10 microns.

6. A process according to claim 1 wherein the infrared sensors have output sources in the light wavelength range of from about 600 to about 1,000 nanometers.

7. A process according to claim 1 wherein the imaging apparatus is an electrophotographic imaging apparatus.

8. A process according to claim 1 wherein the imaging apparatus is an ink jet printing apparatus.

9. A process according to claim 1 wherein the substantially transparent receiver sheet comprises a substrate and an ink receptive coating.

10. A process according to claim 9 wherein the coating of the infrared absorbing material and polymeric binder is situated on the surface of the ink receptive coating.

11. A process according to claim 9 wherein the coating of the infrared absorbing material and polymeric binder is situated on the surface of the substrate opposite to that containing the ink receptive coating.

12. A process according to claim 9 wherein the coating of the infrared absorbing material and polymeric binder is situated between the substrate and the ink receptive coating.

13. A process according to claim 1 wherein the coating of the infrared absorbing material and polymeric binder is situated in substantially the same location on each edge of the substantially transparent receiver sheet, thereby enabling the receiver sheet to be detected by the infrared sensors when fed through the apparatus in any orientation.

14. A process according to claim 1 wherein the coating of the infrared absorbing material and polymeric binder is situated on the substantially transparent receiver sheet in an encoded pattern and the imaging apparatus decodes the information contained in the pattern and employs said information to control the imaging process.

* * * * *